(12) United States Patent
Kurita

(10) Patent No.: US 10,005,939 B2
(45) Date of Patent: Jun. 26, 2018

(54) NON-AZEOTROPIC REFRIGERANT FOR EXTREMELY LOW TEMPERATURE

(71) Applicant: NIHON FREEZER CO., LTD., Tokyo (JP)

(72) Inventor: Nobuyoshi Kurita, Bunkyo-Ku (JP)

(73) Assignee: NIHON FREEZER CO., LTD., Tokyo (JP)

( * ) Notice: Subject to any disclaimer, the term of this patent is extended or adjusted under 35 U.S.C. 154(b) by 31 days.

(21) Appl. No.: 15/321,976

(22) PCT Filed: May 18, 2015

(86) PCT No.: PCT/JP2015/064204
§ 371 (c)(1),
(2) Date: Dec. 23, 2016

(87) PCT Pub. No.: WO2016/185539
PCT Pub. Date: Nov. 24, 2016

(65) Prior Publication Data
US 2017/0130111 A1    May 11, 2017

(51) Int. Cl.
*C09K 5/04*    (2006.01)

(52) U.S. Cl.
CPC .......... *C09K 5/045* (2013.01); *C09K 2205/12* (2013.01); *C09K 2205/122* (2013.01); *C09K 2205/34* (2013.01)

(58) Field of Classification Search
CPC .......... C09K 2205/12; C09K 2205/122; C09K 2205/34; C09K 5/045
See application file for complete search history.

(56) References Cited

U.S. PATENT DOCUMENTS

| | | | |
|---|---|---|---|
| 4,622,825 A | * | 11/1986 | Larue ............ C09K 5/047 62/102 |
| 4,865,028 A | * | 9/1989 | Swart ............ A61B 18/0218 128/DIG. 27 |

(Continued)

FOREIGN PATENT DOCUMENTS

| | | |
|---|---|---|
| JP | 3-255856 A | 11/1991 |
| JP | 3571296 B2 | 9/2004 |

(Continued)

*Primary Examiner* — John R Hardee
(74) *Attorney, Agent, or Firm* — Westerman, Hattori, Daniels & Adrian, LLP

(57) ABSTRACT

A non-azeotropic refrigerant mixture attains an extremely low temperature of −200 deg. C. through −150 deg. C. in a refrigerating system equipped with a heat exchanger;
a non-azeotropic refrigerant mixture which attains a low temperature of −100 deg. C. or lower is a non-azeotropic refrigerant mixture which comprises a base refrigerant and R-14 wherein R-14 is contained in an amount of 5 wt % through 40 wt %, whereas the base refrigerant consists of butane plus propane and R-23 plus R-116 as the low boiling point refrigerant;
also, a non-azeotropic refrigerant mixture that attains −120 deg. C. or lower is a non-azeotropic refrigerant mixture which comprises R-50 plus R-740 as well as a base refrigerant and R-14 wherein the base refrigerant/R-14 ratio is 95/5 through 60/40 and R-50 and R-740 are contained respectively in an amount of 1 wt % through 10 wt.

6 Claims, 5 Drawing Sheets

(56) References Cited

U.S. PATENT DOCUMENTS

| | | | | |
|---|---|---|---|---|
| 8,065,874 B2* | 11/2011 | Fong | ............... | F01K 25/06 417/438 |
| 8,450,884 B2* | 5/2013 | Stahlkopf | ............... | F01K 13/02 290/7 |
| 2008/0282725 A1* | 11/2008 | Ishibashi | ............... | F24F 1/0007 62/426 |

FOREIGN PATENT DOCUMENTS

| JP | 3934140 B2 | 6/2007 |
|---|---|---|
| JP | 2007-169331 A | 7/2007 |
| JP | 2009-102567 A | 5/2009 |
| JP | 2011-112351 A | 6/2011 |
| WO | 99/64536 A1 | 12/1999 |
| WO | 2004/051155 A1 | 6/2004 |

* cited by examiner

NON-AZEOTROPIC REFRIGERANT FOR EXTREMELY LOW TEMPERATURE

FIELD OF TECHNOLOGY

The present invention relates to a non-azeotropic refrigerant mixture which is capable of cooling a refrigerating system to extremely low temperatures such as −100 deg. C. through −140 deg. C., or more particularly the invention relates to a non-azeotropic refrigerant mixture which is suitable to enable a simply constructed refrigerating system such as unitary single stage type system to attain extremely low temperatures like −100 deg. C. through −140 deg. C.

Back Ground Technology

Refrigerating systems are in practical use for cooling the interior thereof to a low temperature range such as minus several tens of deg. C. suitable to preserve and store food or the like, or to extremely low temperatures such as −50 deg. C. or lower to preserve the freshness of food as it was before cooling or to store a biological tissue intact in the medical field.

Among the refrigerating systems which attain such extremely low temperatures, the kind which makes use of Joule-Thomson effect based on adiabatic expansion of air and has been used to liquefy the air has come to be in no general use on account of its limited cooling capacity and installation difficulty; on the other hand, the refrigerating system now in general use is the kind wherein the refrigerant is compressed and liquefied in a normal temperature environment while releasing the heat of condensation, and the cooling is effected by the latent heat of vaporization of the liquid phase.

The kind of refrigerant that is used in such refrigerating system is required to condense under a pressure of ten-odd bar in the vicinity of a normal temperature in relation to the capacity of the practical compressor, and also is required to have a contradictory property to this, which is that its boiling point is equal to or lower than the aimed extremely low temperature so as to attain the aimed extremely low temperature.

In order to satisfy these requirements, there has been a conventionally used refrigerating system which is a combination of a refrigerating system which operates with a high boiling point refrigerant that condenses at normal temperatures and a refrigerating system which attains lower temperatures by using a low boiling point refrigerant; in this combined refrigerating system, the condenser of the refrigerating system which uses the low boiling point refrigerant is cooled by the refrigerating system which uses the high boiling point refrigerant to thereby condense the low boiling point refrigerant whereby the aimed extremely low temperature is attained.

This system is simple in principle, but it is necessary to combine as many refrigerating systems as the number of the refrigerants used, so that the number of the parts becomes many and the system becomes complicated and bulky, which renders the system easy to malfunction and costly.

As opposed to this, there is another refrigerating system in practical use, in which a refrigerant mixture consisting of two or more kinds of refrigerants of varying boiling points is used whereby the system works only with one compressor.

Many of such refrigerant mixtures are of non-azeotropic and as such the properties such as boiling point of the mixture will be the median of those of the constituent refrigerants so that it is possible to obtain a refrigerant mixture which has a desired properties; however on account of the nature of non-azeotropicity, the boiling point changes with temperature and pressure and the ratio of the liquid phase to the vapor phase also changes during the condensation and evaporation stages whereby the boiling point also changes further with such changes.

On account of this, the mixture is made by combining refrigerants that have boiling points and other properties that are in vicinities to each other, and then the refrigerant of low temperature that is returning to the compressor after its evaporation is used to cool the refrigerant that is going to the evaporator to thereby promote its condensation so that it becomes possible to deal the mixture as if it were a single refrigerant.

However, in the case of a refrigerant mixture for attaining an extremely low cooling temperature such as −50 deg. C. or lower, this kind of system cannot cause the low boiling point refrigerant to undergo condensation with a result that a stabilized operation of the refrigerating system has been difficult to attain.

On account of this, in a refrigerating system which uses a non-azeotropic refrigerant mixture combining a high boiling point refrigerant capable of condensing at normal temperatures and a low boiling point refrigerant capable of attaining an extremely low temperature, the liquid phase rich in the high boiling point refrigerant, which has condensed at the normal temperatures, is separated from the vapor phase rich in the low boiling point refrigerant, which has not condensed, and the low boiling point refrigerant is cooled and condensed by means of the latent heat created by the evaporation of the liquid-phase high boiling point refrigerant (Patent Publication 1: Japanese Patent Application Publication H03(1991)-2558567).

This system is advantageous in that only one compressor is needed; however, depending on the extremely low temperature aimed, it is necessary to undergo a multi-stage vapor-liquid separation and a heat exchange process consisting of evaporation and condensation, so that the complicity of the operation is unavoidable.

In contrast to this, the present inventors conceived the following: on account of the phenomenon that a non-azeotropic refrigerant undergoes changes in composition ratio of the liquid phase to the vapor phase as well as in boiling point as the temperature and pressure change, it is thought that as the high boiling point refrigerant-rich liquid phase, which has been condensed in the initial compression and heat release stage at the normal temperatures, is evaporated in the evaporation stage and the cooling proceeds, the composition of the remnant liquid phase shifts toward the high boiling point side, so that, at the cooling temperature thus attained, the liquid phase of the high boiling point refrigerant remains; by cooling the refrigerant after the initial compression and condensation with the latent heat as well as the sensible heat, the liquid phase composition in the refrigerant is shifted toward the low boiling point side, and then as the refrigeration cycle is put in progress the composition of the condensed liquid phase is shifted toward the low boiling point rich side, whereby within a fixed composition range it is possible to condense the total amount of the non-azeotropic refrigerant.

Then, by means of such a non-azeotropic refrigerant, a refrigerating system was realized which attains extremely low temperature with the use of non-azeotropic refrigerant without going through vapor liquid separation, which has been regarded indispensable in the conventional refrigerating system. (Patent Publication 2: Japanese Patent No. 3934140)

The structure of the refrigerating system is shown in FIG. 1, and the refrigeration cycle will be explained.

With reference to the figure, the non-azeotropic refrigerant compressed to a pressure of several bar to ten-odd bar in the compressor 1 is transported to condenser 2 as indicated by an arrow, and becomes vapor-liquid mixed phase consisting of, on one hand, a high boiling point refrigerant-rich liquid phase, which can condense at the pressure and the temperature there and contains in part a low boiling point element and, on the other hand, a low boiling point refrigerant-rich vapor phase which has not condensed and contains in part a high boiling point refrigerant.

Next, the vapor-liquid refrigerant mixture is depressurized via a throttle valve 3 (capillary), and are evaporated in the evaporator 4 and then cooled in a freezing chamber 5; the evaporated refrigerant flowing in a returning passage 9 bound for the compressor 1 exchanges heat with the refrigerant in an outgoing passage 8 running from the condenser 2 toward the throttle valve 3, the heat exchange occurring at a contact part 7 of a heat exchanger 6.

Using the low temperature refrigerant on its returning trip to cool the refrigerant on its outgoing trip at the heat exchanger has been practiced conventionally; however it has been for the purpose of stabilizing the operation of the refrigerating system by promoting the condensation of the low boiling point refrigerant in a non-azeotropic refrigerant consisting of refrigerants of like boiling points.

As opposed to this, the present inventors combined, making use of properties of non-azeotropic refrigerants, a high boiling point refrigerant capable of condensing and releasing heat at normal temperatures and a refrigerant having an extremely low boiling point compared to that of the former refrigerant, and they could attain an extremely low temperature of −50 deg. C. or even lower in the refrigerating system through this heat exchanger.

In this refrigerating system, the non-azeotropic refrigerant mixture, as described above, has its high boiling point refrigerant release heat and condense at normal temperatures, while it has its low boiling point refrigerant condensed at a low temperature, which is attained as the high boiling point refrigerant, which has retained its liquid phase status thanks to the cooling stage, evaporates in the heat exchanger.

Throughout this stage the pressure is maintained so that, under this pressure, it is possible to condense the refrigerant gas of a composition corresponding to the boiling point (the temperature inside) of the high boiling point refrigerant liquid phase (or the high boiling point refrigerant-rich liquid phase).

Therefore, by selecting the constituents and composition of the non-azeotropic refrigerant mixture in response to these conditions, it becomes possible, through this cooling cycle, to eventually condense the total amount of the non-azeotropic refrigerant mixture and to cool down to its boiling point.

Also, the combination of such refrigerants is thought to work even in the case of a combination among refrigerants of lower boiling points.

It other words, although these low boiling point refrigerants cannot condense at normal temperatures, it is possible to cool them down to the boiling point of the liquid phase of the high boiling point refrigerant (or high boiling point refrigerant-rich liquid phase) in the heat exchanger, so that by selecting the constituents of the non-azeotropic refrigerant mixture and a range of its composition in a manner such that the resultant non-azeotropic refrigerant mixture can condense at the temperature, it becomes possible to condense all the compositions of the non-azeotropic refrigerant mixture and to lower the temperature to its boiling point.

If such a non-azeotropic refrigerant mixture is realized, this mechanism can apply further to compositions wherein a low boiling point refrigerant is added to this base refrigerant; by selecting the boiling point and the range of the contents as well as the kind of the low boiling point refrigerant which can be condensed within a cooling temperature range that is attainable by this non-azeotropic refrigerant mixture as the base refrigerant, it comes to pass that the temperatures at which the high boiling point refrigerants capable of condensing at normal temperatures as well as the compositions including a refrigerant of lowest boiling point can condense can be determined successively based on the boiling points thereof, so that by virtue of this cycle the condensation of the low boiling point refrigerant rich composition, which has the lowest boiling point, proceeds until the condensation reaches an equilibrium under the conditions of the composition of the non-azeotropic refrigerant mixture and the pressure conditions.

However, with regard to such cycle, it is not possible to arbitrarily select the combination of the contents based only on the respective properties of the refrigerants such as boiling point and vapor pressure.

When a low boiling point refrigerant is added to a non-azeotropic refrigerant mixture, as the base refrigerant, which is a combination of refrigerants, phenomena are observed such that the pressure is pushed up so high that no practical condensation occurs or that the condensation does not proceed owing to a large difference in boiling point, so that in determining the combination of the refrigerants and the scope of the composition of the constituting refrigerants, it is necessary to confirm the appropriateness of the selection through experiments besides the consideration based on the properties.

From a viewpoint like this, in order to attain extremely low temperatures in the range of −100 deg. C. through −150 deg. C., it is propitious to make a non-azeotropic refrigerant mixture by combining refrigerants that have boiling points which differ relatively small among each other with a high boiling point refrigerant capable of condensing at normal temperatures, and using this as the base a further refrigerant is to be selected which is capable of constructing the above-mentioned refrigeration cycle and has a yet lower boiling point.

It is desirous that the non-azeotropic refrigerant as the base refrigerant can attain a required cooling temperature with respect to a wide range of its composition and that at the same time the pressure required for the condensation is relatively low, so that throughout the operation range these values describe flat curves and enable a stabilized cooling performance.

If so, it is possible not only to expand the scope of the alternatives from which the selection is made for a combination involving a refrigerant of lower boiling point, but also to adopt a combination involving the low boiling point refrigerant with respect to the wide range of the composition of the non-azeotropic refrigerant mixture as the base refrigerant, whereby the effect is attained also.

Upon use of these non-azeotropic refrigerant mixtures, it is to be remembered that many variable factors are involved such as the environmental temperature, installation capacity of the refrigerating system as well as the magnitude of the load imposed by the object to be cooled and its variation, so that the optimum range of the composition of the refrigerant is also liable to change in response to those changes, wherefore these properties are important on account of the fact that it is necessary to select from these wide ranges when application is made to the real system.

Based on the above perception, the present inventors investigated on the basis of the non-azeotropic mixed refrigerants which they made previously with a view to attaining the cooling temperatures of −50 deg. C. or lower (Patent Publication 2: Japanese Patent No. 3934140; Patent Publication 3: Japanese Patent No. 3571296).

Of these the non-azeotropic refrigerant mixture of Patent Publication 3 was made by combining butane, propane or the like, which can condense at normal temperatures, with perfluoroethane ($C_2H_6$:R-116), trifluoromethane ($CHF_3$:R-23) or the like, which have boiling points lower than −50 deg. C., whereby the intra-chamber temperature of −60 deg. C. through −75 deg. C. was attained and a stabilized performance was observed with the discharge pressure of the compressor being within a range of 15 through 25 bar.

Also, combinations of butane with, respectively, ethane (boiling point: −88.65 deg. C.), ethylene (boiling point: −103.2 deg. C.), and tetrafluoromethane (R-14: boiling point: −128 deg. C.), which have still lower boiling points, were tested (Patent Publication 2: Japanese Patent No. 3934140); however, in the case of a combination of butane, which condenses at normal temperatures, with one or two selected from ethane, ethylene and R-14, although intra-chamber temperature of −50 deg. C. through −86 deg. C. was attained, as the contents (dosages) of ethylene and R-14 were increased the pressure rose rapidly so the refrigerating system failed to operate.

It is thought that this happened because the difference in boiling point between the high boiling point butane on one hand and ethylene and R-14 on the other is so great as well as that the vapor pressure of ethylene is so high that the cycle failed to exhibit sufficient effect of the non-azeotropic refrigerant mixture, with a result that the condensation of these low boiling point refrigerants failed to proceed.

From the above result, it was thought that, to realize the cooling to lower temperatures of −100 deg. C. or lower, the 4-element refrigerant which was tried, according to Patent Publication 3, on account of its good balance between the high boiling point elements and lower boiling point elements should be appropriate, and thus study was made concerning the selection of low boiling point refrigerants, their combinations, and compositions.

PRIOR ART DOCUMENTS

Patent Publications

[Patent Publication 1]
Japanese Patent Application Publication H03(1991)-255856
[Patent Publication 2]
Japanese Patent No. 3934140
[Patent Publication 3]
Japanese Patent No. 3571296

SUMMARY OF INVENTION

Problems the Invention Seeks to Solve

It is an object of the present invention to realize a non-azeotropic refrigerant mixture which is capable of attaining extremely low temperatures in the range of −100 deg. C. through −150 deg. C. using a refrigerant that does not contain a specified chlorofluorocarbon (CFC) or a designated hydro-chlorofluorocarbon (HCFC), in a simply constructed refrigerating system having ordinary capacity and potency.

It is also an object of the present invention to develop a non-azeotropic refrigerant which enables a refrigerating system, in which unitary vapor-liquid separation is not conducted with a single compressor but a heat exchange is conducted between the refrigerant on a returning trip to the compressor and the refrigerant on an outgoing trip toward the throttle valve, to attain an extremely low temperature in a range of −100 deg. C. through −150 deg. C.; and as a matter of fact such non-azeotropic refrigerant is also applicable to a refrigerating system equipped with a vapor-liquid separator.

Means to Solve the Problems

A non-azeotropic refrigerant mixture is proposed which comprises a base refrigerant containing high boiling point refrigerants which release heat to condense at normal temperatures and tetrafluoromethane (R-14), wherein:
a base refrigerant/R14 ratio in weight is 95/5 through 60/40 (i.e., R-14 accounts for 5 wt % through 40 wt % of the total of base refrigerant plus R14);
the base refrigerant consists of propane plus butane as the high boiling point refrigerant, which condenses at normal temperatures, and also of trifluoromethane (R-23) plus perfluoroethane (R-11) as the low boiling point refrigerant;
the base refrigerant contains propane plus butane in an amount of 35 wt through 70 wt % and the balance consists of R-23 plus R-116; and
in the base refrigerant, R-23 accounts for 70 through 15 wt % of R-23 plus R-116, and R-116 accounts for 30 through 85 wt % thereof.

In addition to the above-defined non-azeotropic refrigerant mixture, a non-azeotropic refrigerant mixture is proposed which is a low boiling point refrigerant capable of attaining a low temperature of −120 deg. C. or lower, and comprises:
a base refrigerant containing a high boiling point refrigerant which releases heat to condense at normal temperatures and tetrafluoromethane (R-14), methane (R-50) and argon (R-740), wherein:
a base refrigerant/R14 ratio in weight is 95/5 through 60/40 (i.e., R-14 accounts for 5 wt % through 40 wt % of the total of base refrigerant plus R14);
the base refrigerant contains propane plus butane in an amount of 35 wt through 70 wt % and the balance consists of R-23 plus R-116;
R-23 accounts for 70 through 15 wt % of R-23 plus R-116, and R-116 accounts for 30 through 85 wt % thereof, and
R-50 and R-740 account for 1 wt % through 10 wt %, respectively.

Also, a non-azeotropic refrigerant mixture is proposed, which is applicable to a refrigerating system equipped with a structure whereby a refrigerant on its returning trip toward a compressor exchanges heat with a refrigerant on its outgoing trip toward a throttle, the said non-azeotropic refrigerant mixture comprising the composition stated above.

Effects of the Invention

The non-azeotropic refrigerant mixture of the present invention, when it is applied to a refrigerating system having a capacity and potency as are realized in a conventional refrigerating system, is capable of attaining with ease extremely low temperatures in the range of −100 deg. C. to −150 deg. C. or even −150 deg. C., and furthermore the non-azeotropic refrigerant mixture of the present invention can promote long-term stable operation of a refrigerating system for it has excellent properties for maintenance such as compatibility with lubricating oil.

EXAMPLES TO EMBODY INVENTION

Figure 1:
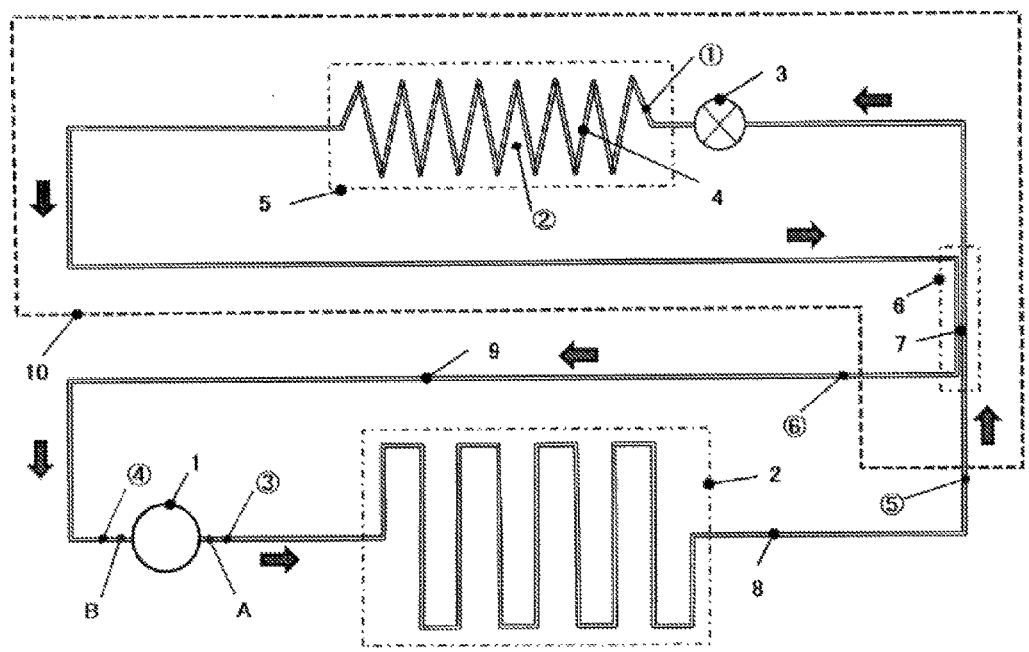
FIG. 1 is a schematic drawing of a refrigerating system used in an example.

As is described above, a non-azeotropic refrigerant mixture which attains extremely low temperatures of −100 deg. C. through −150 deg. C. is composed of a high boiling point refrigerant which releases heat and condenses at normal temperatures, a non-azeotropic refrigerant mixture as a base refrigerant which combines refrigerants having boiling points lower than that of the said high boiling point refrigerant, and low boiling point refrigerant(s) capable of attaining an aimed low temperature; it is thought that the 4-element mixed non-azeotropic refrigerant consisting of R-23 plus R-1 plus propane plus butane, which is developed by the present inventors and described in Patent Publication 3, is appropriate as the base refrigerant that attains the cooling temperature of −100 deg. C. or lower by being added with a refrigerant having a lower boiling point, and similarly it is appropriate as the refrigerant to make the base that attains a cooling temperature of −150 deg. C. or lower.

The content described in Claim 1 regarding the non-azeotropic refrigerant mixture containing R-23, R-116, propane and butane as disclosed in Patent Publication 3 (Japanese Patent No. 3571296) was as follows: (Claim 1)

"A refrigerant for extremely low temperature comprising trifluoromethane ($CHF_3$:R-23), perfluoroethane ($C_2F_6$:R-116), and at least one of propane and n-butane, wherein a mixture ratio of said trifluoromethane and perfluoroethane is trifluoromethane by 70 through 15 wt % and perfluoroethane by 30 through 85 wt %, and the content of said propane is 55 through 95 wt % or that of n-butane is 50 through 90 wt %, or that of both is 35 through 70 wt %."

Therefore, the 4-element non-azeotropic refrigerant mixture containing all of R-23, R-116, propane, and butane comprises propane plus butane as a combination of high boiling point refrigerants that release heat and condense at normal temperatures in an amount of 35 through 70 wt % and the balance, which is the combination of low boiling point refrigerants consisting of R-23 plus R-116, in an amount of 65 through 30 wt %, wherein R-23 accounts for 70 through 15 wt % of R-23 plus R-116, and R-116 accounts for 30 through 85 wt % thereof.

Herein below the non-azeotropic refrigerant mixture of the above composition shall be called base refrigerant.

The 4-element non-azeotropic refrigerant mixtures having above compositions are capable of attaining cooling temperatures of −60 deg. C. or lower; and from the fact that such cooling temperatures were attained with the compressor pressure of 15 through 25 bar, refrigerants were selected which can condense at the cooling temperature attainable by the base consisting of this 4-element refrigerant whereby a cooling temperature of −100 deg. C. or lower was attained; and then, refrigerants were selected which can condense at this temperature so as to find out the elements and compositions of non-azeotropic refrigerant mixture which can attain a yet lower temperature of −150 deg. C.

For a reason of practicality, the kind of refrigerants that can be adopted for such combination is limited; the refrigerants that the present inventors studied are listed with their properties in Table 1.

TABLE 1 refrigerants considered and their properties

| refrigerant reference | chemical name | structural formula | boiling point (° C. 1 atm) | critical temperature (° C.) | vapor pressure (MPa) |
|---|---|---|---|---|---|
| R-600 | butane | $C_4H_{10}$ | −0.51 | 151.97 | 0.278, (40° C.) |
| R-290 | propane | $C_3H_8$ | −42.07 | 96.62 | 1.269, (40° C.) |
| R-116 | p-fluoroethane | $CF_3CF_3$ | −78.15 | 19.65 | 2.981, (19.65° C.) |
| R-23 | trifluoromethane | $CHF_3$ | −82.15 | 25.85 | 4.715, (25° C.) |
| R-1150 | ethylene | $C_2H_4$ | −103.50 | 9.2 | 5.2 (9.9° C.) |
| R-170 | ethane | $C_2H_8$ | −88.65 | 32.2 | 3.8 (21° C.) |
| R-14 | tetrafluoromethane | $CF_4$ | −127.85 | −45.55 | 3.69 (21° C.) |
| Kr | krypton | — | −153.4 | −63.8 | — |
| R-50 | methane | $CH_4$ | −161.48 | −82.595 | 34.899 (40° C.) |
| R-740 | argon | — | −185.8 | −122.45 | — |

Ethylene was dropped as a candidate for the low boiling point refrigerants to constitute the base refrigerant to attain a cooling temperature of −100 deg. C. or lower for the following reason: although ethylene has a high critical temperature, its vapor pressure as well as its boiling point are relatively high too, and it has been thought that these features were the causes that pushed up the pressure during the operation of the refrigerating system.

In contrast to this, R-14 has a low vapor pressure and from its critical temperature it can condense at the cooling temperatures of −60 through −75 deg. C., which are attained by the base refrigerant as the non-azeotropic refrigerant mixture, through a wide range of content, and it is thought that it can attain even lower temperatures.

EXAMPLE 1

(1) Non-azeotropic refrigerant mixture capable of attaining a cooling temperature of −100 deg. C. or lower.

Table 2 shows data such as the composition of R-14 added to the base refrigerant and the cooling temperature attained by the refrigerating system.

The refrigerating system having a structure shown in the schematic drawing of FIG. 1 was used as the experiment apparatus.

This refrigerating system is in fact used also for preservation of a biological tissue for medical use, and for the purpose of securing reliability in professional use, the entire circulation passage for the refrigerant in the refrigerating system was made double-fold from the evaporator/freeing chamber through the compressor (one freezing chamber is shared). For this reason, there were arranged two pressure measurement sites in each of them, and measurement was done at the primary and the secondary sites.

Accordingly, the refrigerant in a total amount of 1,000 g was divided in two, 500 g in one fold and the other 500 g in the other fold, so that each circulates independently in the refrigerating system and is introduced to one freezing chamber to be cooled.

Therefore, there is an advantage in that the temperature and pressure can be measured with respect to each passage and the results can be compared so as to observe the behavior of the refrigerant through the operational status of the refrigerating system.

For example, in this real system operation, the difference between the temperature measured at the outlet of the throttle (capillary) and the temperature measured at the middle of the chamber, both in the case of the primary site and the secondary site, was very small (less than 1 deg. C.), so that it was confirmed that the non-azeotropic refrigerant of the present invention performed to its maximum cooling capacity, and it was also confirmed that these refrigerants were easy to handle and that the operation status of the refrigerating system was stable; however, on the other hand, it was observed that, with respect to both passages, the pressure underwent variation both at the high pressure side and low pressure side not only at the operation start time by also other time.

Although the detail of the cause is not known, these variations in pressure are thought to reflect the high responsiveness of the condensation phenomenon of the low boiling point refrigerants, and in particular, since the variations occurred extensively in the vicinities of the boundary of the favorable range, this observation was considered in the estimation and judgement for the preferable range and practical usage boundary of the refrigerant composition.

The above-mentioned publicly known 4-element non-azeotropic refrigerant mixture was used as the base refrigerant, and the following composition was adopted in this example.

A base was prepared in the form of 4-element non-azeotropic refrigerant mixture composed in a manner such that propane plus butane accounts for 60 wt %, the balance, namely R-23 plus R-116, accounts for 40 wt %, a propane/butane ratio of propane plus butane is 25/75 (the propane accounts for 15.0 wt % of the total base refrigerant, and the butane accounts for 45.0 wt % thereof); a R-23/R-116 ratio of R-23 plus R-116 is 39/61 (R-23 accounts for 15.6 wt % of the total base refrigerant, and R-116 accounts for 24.4 wt % thereof).

Incidentally, the mixture ratio of the refrigerants was altered by plus/minus 5 g from the aimed wt % value so as to observe its effects.

TABLE 2 composition of base refrigerant and R-14 and measurements at different sites

| refrigerant mixing ratio % (g) | | pressure on high pressure side (bar) | | pressure on low pressure side (bar) | | (1) intra-chamber temperature (° C.) | temperature at various sites (° C.) | | | |
|---|---|---|---|---|---|---|---|---|---|---|
| base refrigerant | R-14 | primary | secondary | primary | secondary | | ③ high pressure exit | ④ low pressure entrance | ⑤ heat exchanger entrance | ⑥ heat exchanger exit |
| 95 | (20) | 6.3 | 6.3 | 0.1 | 0.7 | −98.1 | 86.9 | 32.2 | 32.8 | 32.0 |
| (475) | 5 (25) | 6.2 | 6.4 | 0.1 | 0.7 | −100.5 | 85.7 | 31.5 | 32.4 | 31.4 |
| | (30) | 6.1 | 6.3 | 0.1 | 0.7 | −101.5 | 86.8 | 31.4 | 31.9 | 31.1 |
| 90 | (45) | 6.8 | 6.5 | 0.1 | 0.6 | −106.1 | 88.7 | 32.2 | 33.4 | 32.0 |
| (450) | 10 (50) | 6.6 | 6.9 | 0.1 | 0.5 | −108.4 | 87.6 | 31.6 | 32.2 | 31.3 |
| | (55) | 6.5 | 6.5 | 0.1 | 0.5 | −110.0 | 85.5 | 30.6 | 32.0 | 30.6 |
| 80 | (95) | 7.9 | 7.9 | 0.1 | 0.5 | −114.7 | 89.6 | 29.3 | 29.6 | 29.0 |
| (400) | 20 (100) | 7.8 | 81 | 0.1 | 0.6 | −115.5 | 90.0 | 29.0 | 29.5 | 28.8 |
| | (105) | 7.6 | 8.1 | 0.1 | 0.8 | −116.1 | 89.1 | 28.9 | 29.0 | 28.5 |
| 70 | (145) | 9.5 | 9.6 | 0.1 | 0.8 | −115.5 | 95.7 | 30.2 | 30.4 | 30.1 |
| (350) | 30 (150) | 9.3 | 9.6 | 0.1 | 0.7 | −116.0 | 95.8 | 30.4 | 30.8 | 30.4 |
| | (155) | 9.4 | 9.8 | 0.1 | 0.8 | −116.1 | 96.0 | 30.7 | 31.1 | 30.5 |
| 60 | (195) | 10 | 10.4 | 0.1 | 0.5 | −117.1 | 99.3 | 30.4 | 30.8 | 30.2 |
| (300) | 40 (200) | 9.8 | 10.4 | 0.1 | 0.7 | −117.6 | 99.1 | 30.4 | 30.6 | 30.0 |
| | (205) | 9.9 | 10.1 | 0.1 | 0.6 | −117.9 | 99.2 | 29.9 | 30.1 | 29.6 | total amount of refrigerant: 500 × 2 (primary plus secondary): total 1,000 g, 1 bar = 0.1 MPa The intra-chamber temperature was measure in the middle of the freezer chamber. Also, the intra-chamber temperature differed from the capillary exit temperature by 1 deg. C. or less, so that the normal operation conditions were satisfied.

The capillary exit temperature was within a range wherein that element (composition) of the non-azeotropic refrigerant mixture which has the lowest boiling point evaporates; thereafter, as this evaporation proceeded in the evaporator the composition shifted toward the high boiling point side, and the refrigerant elements remaining in the liquid phase were the kind that have higher boiling points so that the boiling point of the refrigerant mixture rose so that it is thought that the vicinity of the capillary exit temperature site was where the temperature was the lowest in the entire circulation passage of the refrigerating system in which the refrigerant circulates; however, when the refrigerating system was in the normal operation status, the temperature differed from the temperature in the middle of chamber by plus/minus 1 deg. C. at maximum, and this shows that the condensation of these low boiling point elements was proceeding sufficiently.

With reference to the results in Table 2, the high pressure side exit (3) was caused to have a high temperature by the temperature of the compressed refrigerant gas, whereas the temperatures measured at the low pressure side entrance (4), the heat exchanger entrance (5), and the heat exchanger exist (6) were, respectively, the temperature of the refrigerant gas after the heat exchange, that of the refrigerant gas after being caused to release heat by the condenser, and that of the refrigerant gas after exchanging heat with the refrigerant on its outgoing trip in the heat exchanger; the temperatures of these refrigerant gases are such that (5)>(6) ≈(4) and the differences among them were so small that it was understood that the heat exchange worked very effectively.

Incidentally, the temperature of the refrigerant that travels toward the evaporator from the heat exchanger after the heat exchange could not be measured because the structure of the system was such that the external temperature was shut off, however, from the fact that the intra-chamber temperature was −100 deg. C. or lower, it is thought that the temperature would be eventually cooled to the vicinities of low temperatures, and these temperatures are in the vicinity of the boiling point of R-14, and as is described later, since the pressure value was maintained low, it is understood that R-14 worked effectively to cool and condense throughout its scope of composition.

Figure 2:
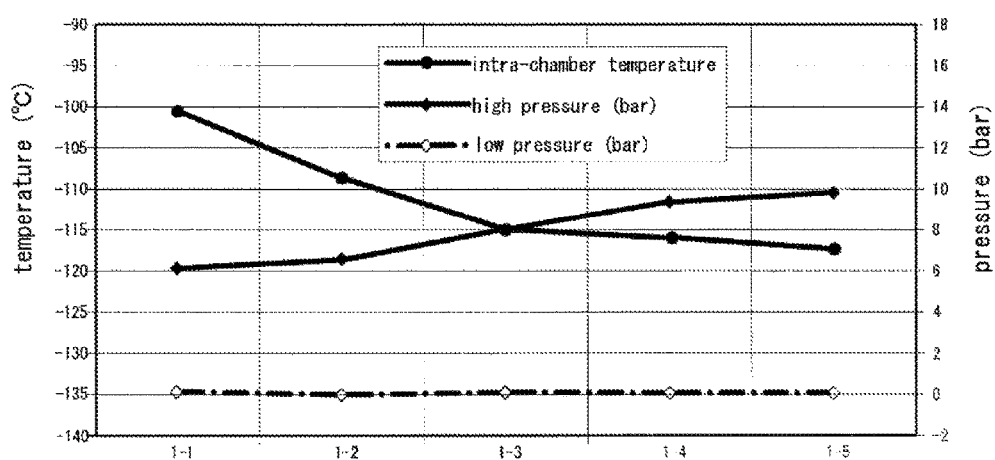
FIG. 2 is a graph showing the effect of the addition of R-14 to a 4-element base refrigerant consisting of R-23, R-116, propane and butane.

The above data are shown in the graph of FIG. 2, wherein the temperature in the middle of the chamber (intra-chamber middle-wise temperature), the high pressure side pressure, and the low pressure side pressure are plotted against the amount of R-14 added to the base refrigerant.

From these data and FIG. 2, it is understood that the effect of adding R-14 to the base refrigerant is attained throughout the wide range of the content of R-14, which is 5 through 40%, and throughout the range of the temperature in the middle of the chamber, which is roughly −100 deg. C. through −120 deg. C., and also that the pressure meanwhile was maintained at a very low value of 6 through 10 bar when the normal operation status was maintained, so that the condensation of the elements of the non-azeotropic refrigerant mixture was accomplished.

This property is a very excellent characteristic for it enables a refrigerant which attains low temperatures of −100 deg. C. through −110 deg. C. to work with a refrigerating system in a conservative manner in relation to the capacity and potency of the system, and it enables the system to operate steadily.

The range of composition of the refrigerant mixture which helps to attain this range of cooling temperature is 5 wt % through 40 wt % by which R-14 is contained in the afore-mentioned 4-element base refrigerant.

This range of cooling temperature is attained even if the composition is somewhat outside the said range of composition; however, in the range of less than 5 wt % there is a tendency that the temperature rises from the vicinity of −100 deg. C.; and also in the vicinity of 40 wt %, although the temperature of −117 deg. C. or lower is maintained, the pressure tends to rise more or less so that the practical content of R-14 is to be 5 wt % through 40 wt %.

Also, in these ranges, the pressure value is yet 10 bar or lower, which is a very good practical value, and also such refrigerant is thought to be a preferable refrigerant to make the base for attaining an even lower temperature.

From the above, there is proposed a non-azeotropic refrigerant mixture of the present invention that attains a low temperature of −100 deg. C. or lower, wherein the said non-azeotropic refrigerant mixture comprises a base refrigerant as a high boiling point refrigerant and R-14 as the low boiling point refrigerant, R-14 being contained in an amount of 5 wt % through 40 wt % (a base refrigerant/R-14 ratio is 95/5 through 60/40).

In the above-described mixture, the base refrigerant comprises propane plus butane as the high boiling point refrigerant which condenses at a normal temperature as well as R-23 plus R-11 as the low boiling point refrigerant;

in this base refrigerant, propane plus butane accounts for 35 wt % through 70 wt %, and the balance is R-23 plus R-116, whereas out of R-23 plus R-11, R-23 accounts for 70 wt % through 15 wt % and R-116 accounts for 30 wt % through 85 wt %.

The above result also suggests that it is possible to lower the cooling temperature further by combining this refrigerant mixture with a refrigerant having a lower boiling point without departing from the composition range.

Now, as a low boiling point refrigerant which can condense at a cooling temperature of −100 deg. C. or lower that is attainable under this stable condition, methane (R-50) having a critical temperature of −82 deg. C. is thought capable of condensing, and for the purpose of further lowering the cooling temperature, the inventors tested a combination of this methane with argon (R-740) which has a yet lower boiling point and a critical temperature of −122.45 deg. C.

EXAMPLE 2

(2) Non-azeotropic refrigerant mixture which can attain −120 deg. C. through −150 deg. C.

The inventors tested a refrigerant which comprises a non-azeotropic refrigerant consisting of a base refrigerant plus R-14 combined with methane and argon so as to attain a cooling temperature and intra-chamber temperature of −120 deg. C. through −150 deg. C. The compositions and the results obtained from the refrigerant system are shown in Table 3 and Table 4 below.

The structure and test conditions of the refrigerating system in this test were the same as in the afore-described experiment for the refrigerant mixture comprising the base refrigerant and R-14, and in order to observe the changes that may take place as the composition is altered, the inventors also measured the variation that took place as the content was varied, namely the addition amount of R-50 plus R-74 to the azeotropic refrigerant consisting of base refrigerant plus R-14 was varied by shifting it within the range of plus/minus 5 g relative to the respective mixture ratio of 1 wt % through 9 wt %.

Table 3 relates to a case wherein the ratio of base refrigerant/R-14 was 90/10 and 80/20, and Table 4 shows compositions and measured values in the case where the ratio was 95/5 and 60/40, which was conducted so as to confirm the range for the upper limit and the lower limit for these.

Incidentally, in Tables 3 and 4, in order to show the composition of the totality of the refrigerants in the column for the composition of the refrigerant, we entered the number of grams (g) in addition to the wt % value by which the refrigerant that was introduced with respect to different passage for refrigerants accounts for of the total refrigerants.

TABLE 3 composition after addition of methane and argon to base refrigerant plus R-14; and
result of operation with refrigerating system; (base refrigerant/R-14 ratio being 90/10 and 80/20)

| base refrigerant % (g) | R-14 %(g) | R-50 % (g) | R-740 % (g) | High pressure side pressure (bar) primary/secondary | low pressure side pressure (bar) primary/secondary | intra-chamber temperature (° C.) | ③ high pressure exit | ④ low pressure entrance | ⑤ entrance to heat exchanger | ⑥ exit of heat exchanger |
|---|---|---|---|---|---|---|---|---|---|---|
| base refrigerant/R14 = 90/10 | | | | | | | | | | |
| 88 (441) | 10 (49) | 0 | 0 | 6.6/6.4 | 0.1/0.6 | −109 | 86.3 | 30.4 | 30 | 30.3 |
| | | 1 (5) | 1 (5) | 8.2/8.6 | 0.1/0.8 | −121.2 | 93.6 | 31.8 | 32.8 | 31.4 |
| | | (10) | (10) | 9.6/9.3 | 0.1/0.8 | −133 | 97.3 | 30.9 | 30.9 | 30.3 |
| 85 (423) | 9 (47) | (10) | 10 | 9.4/10.6 | 0.1/0.7 | −134.2 | 95.4 | 30.6 | 31.1 | 30.5 |
| | | 3 (15) | 3 (15) | 10.8/11.3 | 0.2/0.6 | −142.1 | 94.3 | 25.8 | 25.7 | 25.4 |
| | | (20) | (20) | 12.2/11.5 | 0.4/0.7 | −148.8 | 96.3 | 24.2 | 32.8 | 25.7 |
| 79 (396) | 9 (44) | (25) | (25) | 13.3/12.7 | 0.1/0.7 | −149.7 | 107.5 | 24.5 | 32.7 | 24.9 |
| | | 6 (30) | 6 (30) | 12.5/11.9 | 0.2/0.8 | −158.4 | 112.5 | 30.2 | 30.7 | 29.8 |
| | | (35) | (35) | 13.6/13.7 | 0.4/0.9 | −154.6 | 112.6 | 29.8 | 33.1 | 29.6 |
| 72 (360) | 8 (40) | 9 (45) | 9 (45) | 12.7/13.5 | 0.4/0.5 | −158.7 | 125.2 | 28.9 | 32.3 | 29.1 |
| When argon and methane each exceeded 10%, and intra-chamber temperature get in the vicinity of its max. of 158° C. the operation get unstabilized. | | | | | | | | | | |
| base refrigerant/R14 = 80/20 | | | | | | | | | | |
| 78 (392) | 20 (98) | 0 | 0 | 8.2/8.5 | 0.1/0.7 | −114.5 | 92.3 | 31.6 | 31.8 | 31.4 |
| | | 1 (5) | 1 (5) | 10.8/10.2 | 0.1/0.7 | −127.3 | 101.1 | 30.8 | 31.6 | 31.1 |
| | | (10) | (10) | 10.9/11.0 | 0.1/0.7 | −135.5 | 100.3 | 30.7 | 31.4 | 30.8 |
| 75 (376) | 19 (94) | (10) | (10) | 10.8/11.1 | 0.1/0.7 | −135.6 | 98.6 | 32.4 | 33.4 | 32.6 |
| | | 3 (15) | 3 (15) | 10.3/11.2 | 0.1/0.8 | −143.1 | 100.9 | 30 | 32.3 | 30.2 |
| | | (20) | (20) | 11.1/11.4 | 0.1/0.9 | −148.3 | 99.8 | 29.4 | 30.4 | 29.4 |
| 70 (352) | 18 (88) | (25) | 25 | 17.3/15.8 | 0.6/0.7 | −142.4 | 118.8 | 34.1 | 35.4 | 34.1 |
| | | 6 (30) | 6 (30) | 13.8/13.4 | 0.3/0.5 | −132.9 | 117.1 | 30 | 30.1 | 29.6 |
| | | (35) | (35) | 14.0/13.5 | 0.3/0.6 | −155.9 | 118 | 30.1 | 30.9 | 29.7 |
| 64 (320) | 16 (80) | 9 (45) | 9 (45) | 17.9/18.1 | 0.8/0.7 | −153 | 127.6 | 30.5 | 30.8 | 30.8 |
| When argon and methane each exceeded 10%, and when intra-chamber temperature get in the vicinity of 158° C. the operation get unstabilized. | | | | | | | | | | |

TABLE 4 composition after addition of methane and argon to base refrigerant plus R-14; and result
of operation with refrigerating system; (base refrigerant/R-14 ratio being 95/5 and 60/40)

| base refrigerant %(g) | R-14 %(g) | R-50 % (g) | R-740 % (g) | High pressure side pressure (bar) primary/secondary | low pressure side pressure (bar) primary/secondary | intra-chamber temperature (° C.) | ③ high pressure exit | ④ low pressure entrance | ⑤ entrance to heat exchanger | ⑥ exit of heat exchanger |
|---|---|---|---|---|---|---|---|---|---|---|
| base refrigerant/R14 = 95/5 | | | | | | | | | | |
| 93 (485) | 5 (25) | 0 | 0 | 5.9/6.2 | −0.1/−0.1 | −96.2 | 88.3 | 31.8 | 31.9 | 31.4 |
| | | 1 (5) | 1 (5) | 8.0/8.7 | −0.1/−0.1 | −116.1 | 92.7 | 31.0 | 31.8 | 30.6 |
| | | (10) | (10) | 8.1/10.4 | −0.1/−0.1 | −128.0 | 91.4 | 29.1 | 31.1 | 28.3 |
| 89 (447) | 5 (24) | (10) | 10 | 9.7/9.7 | −0.1/−0.1 | −127.7 | 93.7 | 29.8 | 31.2 | 29.0 |
| | | 3 (15) | 3 (15) | 12.9/13.3 | −0.1/0.2 | −135.3 | 104.1 | 18.1 | 33.5 | 17.0 |
| | | (20) | (20) | 13.6/14.4 | 0.3/0.2 | −142.3 | 98.2 | 22.3 | 28.1 | 24.9 |
| 84 (148) | 4 (22) | (25) | (25) | 14.0/13.9 | 0.5/0.3 | −144.7 | 118.1 | 29.8 | 31.8 | 29.0 |
| | | 6 (30) | 6 (30) | 12.5/15.7 | 0.5/0.2 | −152.1 | 123.1 | 26.0 | 32.3 | 24.4 |
| | | (35) | (35) | 12.8/13.2 | 0.4/0.2 | −153.1 | 113.7 | 27.7 | 30.8 | 26.8 |
| 76 (380) | 4 (20) | 9 (45) | 9 (45) | 14.0/13.7 | 0.5/0.5 | −157.5 | 109.5 | 30.9 | 31.3 | 30.4 |
| When argon and methane each exceeded 10%, the operation get unstabilized and when they were 15% no further operation was possible. | | | | | | | | | | |
| base refrigerant/R14 = 80/20 | | | | | | | | | | |
| 59 (594) | 39 (196) | 0 | 0 | 12.1/12.1 | 0.1/0.1 | −111.8 | 106.4 | 30.6 | 30.7 | 30.3 |
| | | 1 (5) | 1 (5) | 12.0/13.4 | 0.1/0.2 | −122.0 | 108.3 | 30.4 | 30.5 | 29.8 |
| | | (10) | (10) | 12.2/14.9 | 0.1/0.3 | −131.5 | 109.5 | 30.7 | 30.1 | 30.0 |
| 58 (282) | 38 (188) | (10) | (10) | 15.6/16.0 | 0.4/0.4 | −125.6 | 119.5 | 31.1 | 31.1 | 30.6 |
| | | 3 (15) | 3 (15) | 15.3/13.7 | 0.4/0.3 | −136.1 | 122.0 | 31.7 | 32.3 | 31.2 |
| | | (20) | (20) | 14.9/14.8 | 0.4/0.3 | −143.4 | 121.7 | 30.6 | 30.1 | 30.5 |

TABLE 4-continued composition after addition of methane and argon to base refrigerant plus R-14; and result
of operation with refrigerating system; (base refrigerant/R-14 ratio being 95/5 and 60/40)

| base refrigerant %(g) | R-14 %(g) | R-50 %(g) | R-740 %(g) | High pressure side pressure (bar) primary/secondary | low pressure side pressure (bar) primary/secondary | intra-chamber temperature (° C.) | ③ high pressure exit | ④ low pressure entrance | ⑤ entrance to heat exchanger | ⑥ exit of heat exchanger |
|---|---|---|---|---|---|---|---|---|---|---|
| 53 (264) | 35 (176) | (25) | (25) | 16.5/15.8 | 0.5/0.5 | −148.2 | 122.8 | 30.8 | 31.3 | 30.1 |
|  |  | 6 (30) | 6 (30) | 18.4/18.0 | 0.6/0.6 | −146.8 | 127.4 | 30.3 | 30/7 | 29.4 |
|  |  | (35) | (35) | 18.4/18.1 | 0.7/0.8 | −148.5 | 129.2 | 30.9 | 31.8 | 30.0 |
| 48 (240) | 32 (160) | 9 (45) | 9 (45) | 22.6/10.4 | 1.0/0.1 | −148.7 | 148.7 | 32.6 | 33.2 | 32.0 |

When argon and methane each exceeded 10%, the operation get unstabilized
and when they were 15% no further operation was possible.

Figure 3:
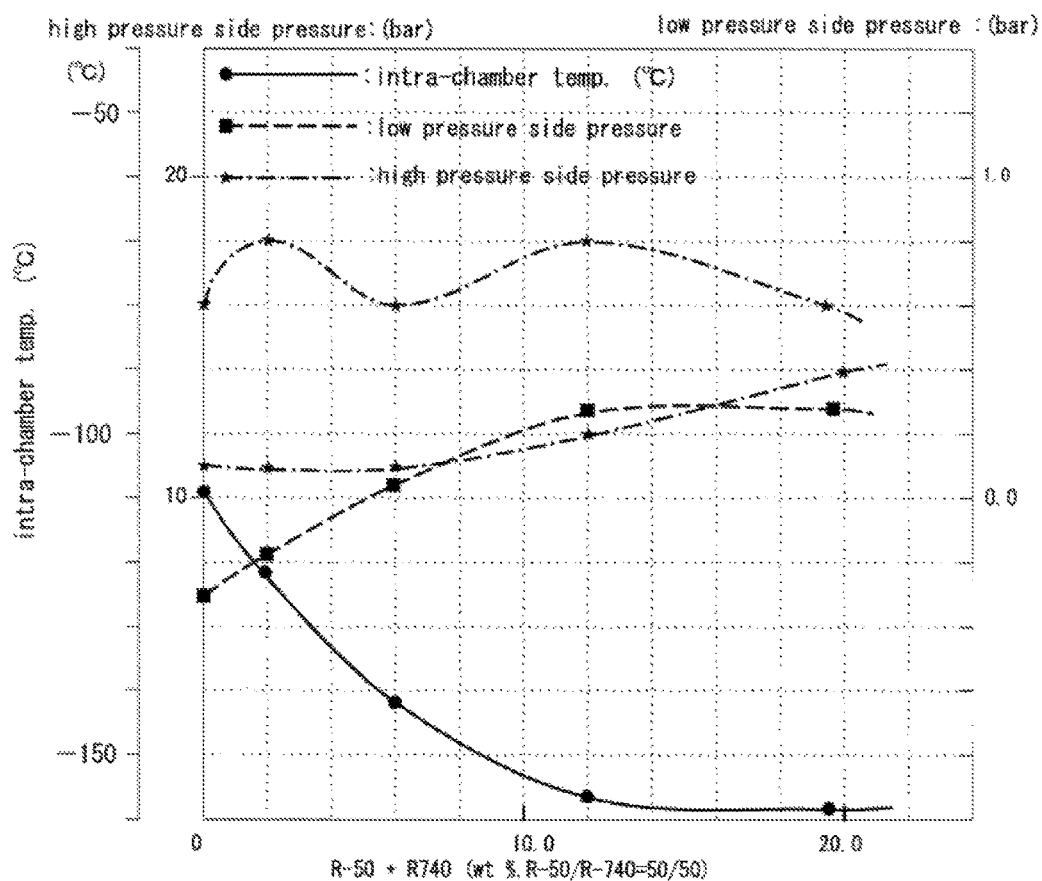
FIG. 3 is a graph showing the effect of the addition of methane plus argon to a refrigerant mixture consisting of a base refrigerant plus R-14, wherein R-14 accounts for 10%.
Figure 4:
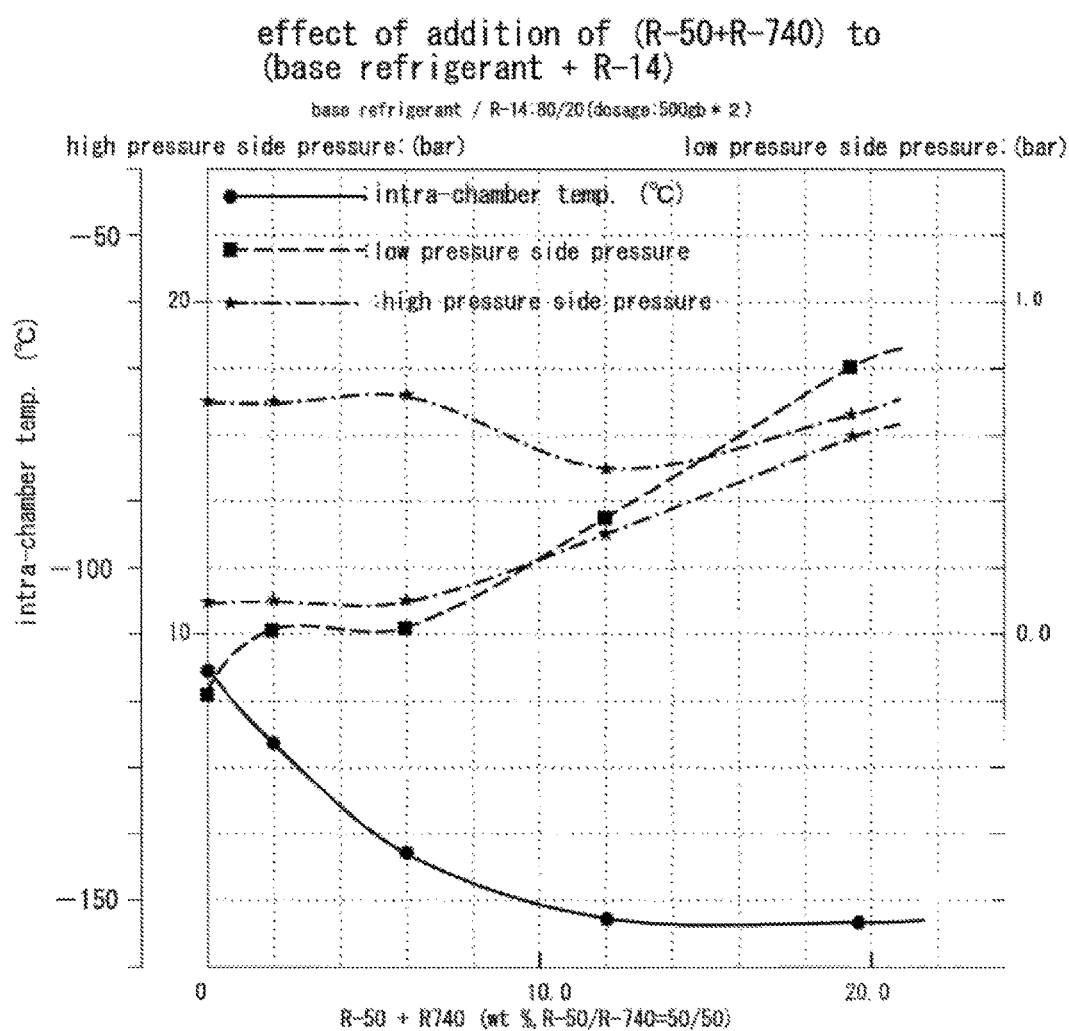
FIG. 4 is a graph showing the effect of the addition of methane plus argon to a refrigerant mixture consisting of a base refrigerant plus R-14 wherein R-14 accounts for 20%.

The above results with respect to the base refrigerant/R14 ratio being 90/10 are plotted on the graph in FIG. 3 and those with respect to the base refrigerant/R-14 ratio being 80/20 are plotted on the graph in FIG. 4.

Figure 5:
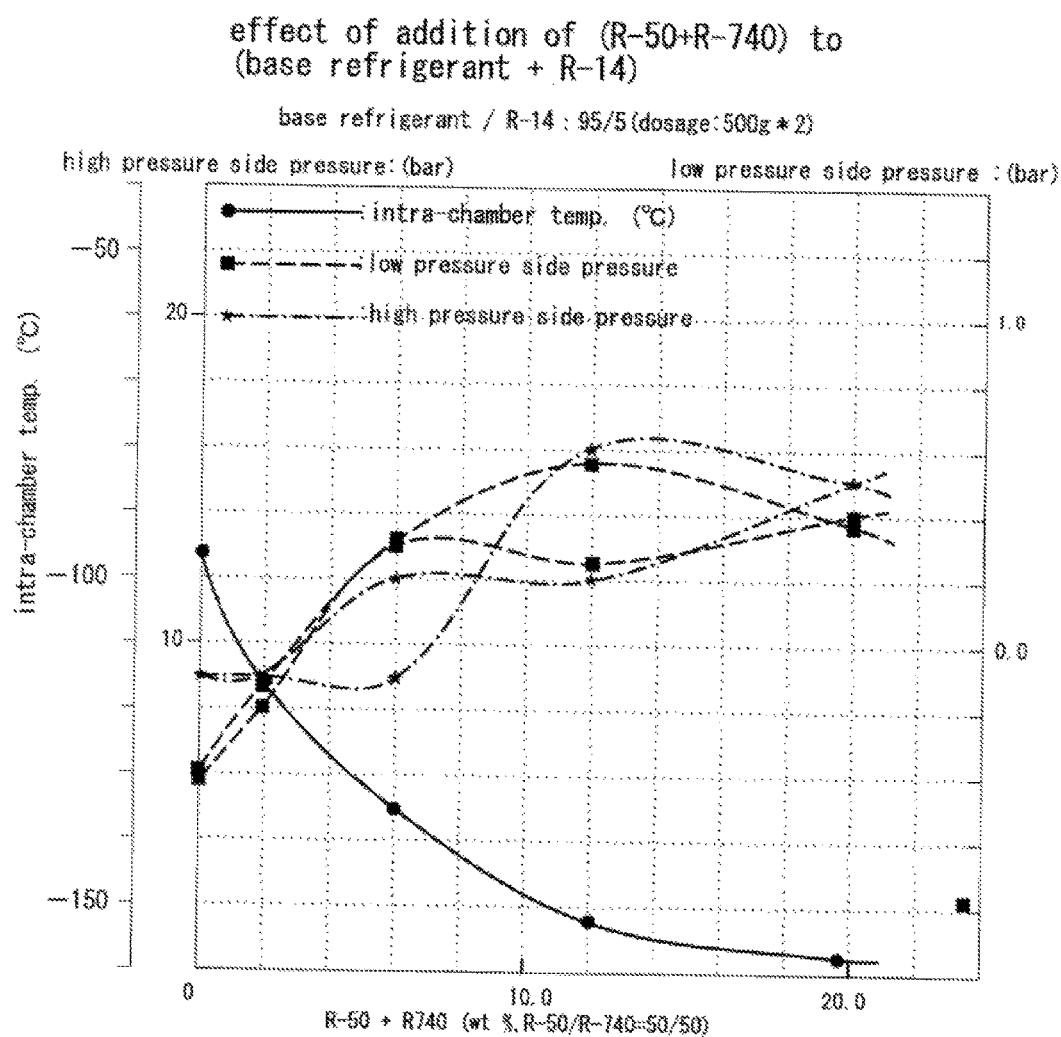
FIG. 5 shows a graph showing the effect of the addition of methane plus argon to a refrigerant mixture consisting of a base refrigerant plus R-14 wherein R-14 accounts for 5%.
Figure 6:
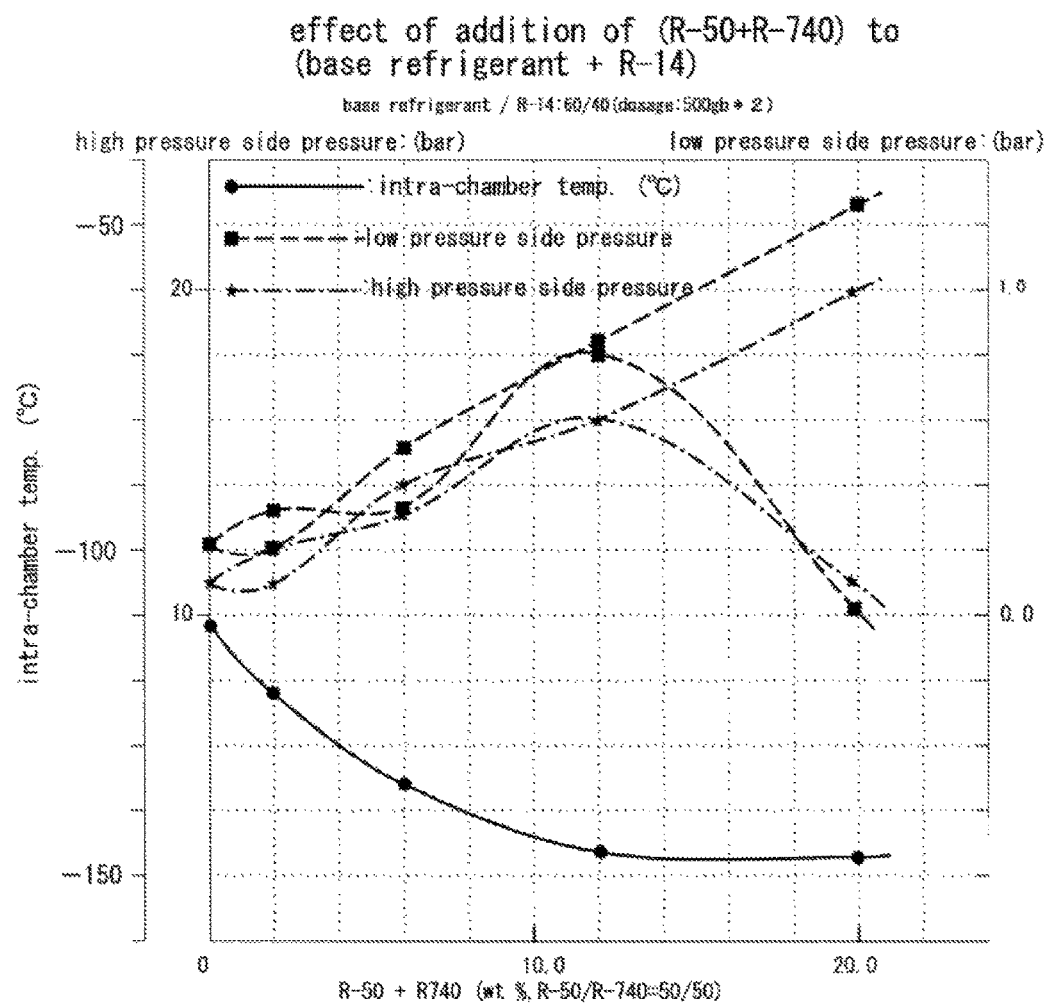
FIG. 6 shows a graph showing the effect of the addition of methane plus argon to a refrigerant mixture consisting of a base refrigerant plus R-14 wherein R-14 accounts for 40%.

Also, the results with respect to the base refrigerant/R-14 being 95/5 are plotted on the graph in FIG. 5 and those with respect to the base refrigerant/R-14 being 60/40 are plotted on the graph in FIG. 6.

(Results of Experiments)

In Table 3, in the case where the base refrigerant/R-14 ratio was 90/10, when R-50 and R-740 were added, the intra-chamber temperature started falling sharply, and when the contents reached 1 wt % each (that is, 2 wt % in total), the intra-chamber temperature got lower than −120 deg. C.; this phenomenon occurring correspondingly with the increase in the contents, that is, when the content exceeded 4 wt % each (that is, 8 wt % in total) the intra-chamber temperature also went down smoothly till it got lower than −150 deg. C.; until each content exceeded 5 wt % (that is, 10 wt % in total) an intra-chamber temperature of −150 deg. C. or lower was maintained, proving an existence of the effect of the addition. This effect was observed even when the addition was less than 1%, and when it exceeded 1 wt %, a cooling effect was observed wherein the temperature dropped beyond −120 deg. C. against base refrigerant plus R-14.

There was not a substantial difference in pressure measured on the high pressure side as well as that on the low pressure side between the primary passage and the secondary passage until the respective content reached 10 wt %; however, when the content exceeded 10 wt %, the pressure values began to vary and got unstabilized, which caused a substantial difference to occur between the measured pressure values taken in the primary passage and the secondary passage.

From these results it is understood that the effect of the addition of R-50 and R-740 was apparent even if their dosages were small but that an optimum range for the contents after the addition so as to attain a low temperature of −120 deg. C. or lower are respectively 1 through 10%.

Similarly, in Table 3, in the case where the base refrigerant/R-14 ratio was 80/20, as the dosages of R-50 and R-740 were increased, the intra-chamber temperature decreased smoothly until it went below −150 deg. C., which shows an occurrence of the effect of these low boiling point refrigerant additives; and when the total contents of these exceeded 10 wt % the operation of the refrigerating system got unstabilized.

These results are shown plotted on the graph in FIG. 3.

As is shown in the graph of FIG. 3, when the base refrigerant/R-14 ratio of the base refrigerant plus R-14 was 90/10, and when the contents of methane and argon respectively exceeded 4 wt % and amounted to 10 wt % (that is, exceeding 8 wt % and amounting to 20 wt % in total), then the intra-chamber temperature went below −150 deg. C. and the pressure stayed within a low range of 11 through 13 bar.

Incidentally, these pressure values do not show substantial differences among each other on the high pressure side so that only the pressure values at the primary site were plotted. The pressures on the low pressure side showed substantial differences between the primary site and the secondary site so that the pressures on both sides were plotted; however, these pressures were inherently of low values so that they are liable to show relative differences and such differences are not a kind that causes a problem in practice. Below, this fact applies also in the cases of FIG. 4 and others.

Also, as is shown in the graph of FIG. 4, when the base refrigerant/R-14 ratio of base refrigerant plus R-14 was in the realm of 80/20 also, as the contents of methane and argon respectively exceed 4 wt % and reach 10 wt % (that is, they respectively exceed 8 wt % and reach 20 wt % in total), the intra-chamber temperature went below −150 deg. C. and exhibited a stabilized flat plotting; whereas the pressure rose linearly from the time when the content of methane plus argon was in the vicinities of 6 wt % from 10 bar to about 18 bar, whereat the content of methane plus argon was about 20 wt %, and then the operation of the refrigerating system got unstabilized.

The pressure values in these experiments were both 13 bar at maximum and about 18 bar, and although it was thought possible to further lower the intra-chamber temperature by raising the pressure higher, these composition ranges were regarded for now as the widest possible practical range for the operation of actual system because the operation of the refrigerating system got unstabilized then.

It is apparent from the above that the effect of methane and argon showed itself even when their addition was small; when the contents of the methane and the argon were respectively 1 wt % (that is, 2 wt % in total) or greater, cooling temperature of −120 deg. C. or lower was attained and when the contents of them were respectively 4 wt % or greater, the cooling temperature reached in the vicinity of −150 deg. C., and when 10 wt %, −150 deg. C. or lower was attained.

Next, in order to find out the upper and lower limit to the appropriate ratio of the base refrigerant/R-14, methane (R-50) and argon (R-740) were added respectively in amounts of 1 wt % through 10 wt % (that is, in total 2 wt % through 20 wt %), as shown in Table 4, with the base refrigerant/R-14 ratio restricted to a range of 95/5 through 60/40 whereby the effect of the addition was ascertained.

The addition amounts of R-50 and R-740 were altered by plus/minus 5 g from 1 wt % through 10 wt % and its effect was ascertained.

With reference to Table 4, when the base refrigerant/R-14 ratio was 95/5, the effect of the addition of methane and argon was recognized such that the cooling temperature got below −120 deg. C. and the intra-chamber temperature went below −150 deg. C. when addition amount was 1 wt % each (that is, 2 wt % in total); however, the pressure value tended to undergo alteration, and especially as the contents increased the effect of the additives magnified and when the contents exceeded 10 wt % each (that is, 20 wt % in total), the operation of the refrigerating system became difficult and the experiment was stopped.

The effect of these is the cause for the creation of the difference between the pressure value of the refrigerant at the primary site and that at the secondary site. In the graph of FIG. 5 on which the result of these measurements is plotted, it is shown that the pressure values on the high pressure side differed respectively between the primary site and the secondary site, such that the graph is divided in two curves, one going over the other. Incidentally, the pressure values on the low pressure side also underwent differentiation between the primary site and the secondary site; however the differentiation was so minute and sensitive to the operational condition of the refrigerating system that it does not cause any practical problem.

With regard to the intra-chamber temperature, it was relatively stable so that the refrigerating effect was confirmed similarly as in the case of the afore-mentioned range; from these results, 5% is regarded as the lower limit for the ratio of base refrigerant to R-14; the effect of methane and argon was observed slightly, and in an attempt to attain a cooling temperature of −120 deg. C. or lower, the appropriate practical range for the content of them respectively is determined roughly as 1 wt % through 10% (that is, 2 wt % through 20% in total); furthermore an appropriate range for methane and argon in an attempt to attain a cooling temperature in the vicinity of −150 deg. C. is regarded as 4 wt % through 10 wt %, respectively.

Further, in the case of base refrigerant/R-14 ratio being 60/40 in Table 4, the effect of the addition of methane and argon to base refrigerant plus R-14 was observed, even when the addition were only in small amounts, and as their contents increased the intra-chamber temperature decreased and the cooling temperature arrived in the vicinity of −150 deg. C.

Also, similarly as in the case of R-14 of base refrigerant/R-14 was in an amount of 5 wt %, as the contents of methane and argon increased, the temperature value became more liable to vary, and especially this tendency was magnified as the contents of the additives were increased; and when the respective contents exceeded 10 wt %, or the contents in total exceeded 20 wt %, the refrigerating system got inoperable, and the experiment was stopped.

The effects of these are reflected in the difference of the high pressure side pressures between the primary site and the secondary site, and are also the cause for the bifurcation of the pressure curves of the relevant graph in FIG. 6.

From these results, 40 wt % is regarded as the practical upper limit for the ratio of R-14 in base refrigerant/R-14; and the effects of methane and argon are evident even when their contents were small, and for the purpose of attaining the cooling temperature of −120 deg. C. or lower, their practically appropriate content ranges are respectively 1 wt % through 10 wt % (that is, in total 2 wt % through 20 wt %) similarly as in the afore-mentioned case, and in order to attain the cooling temperature in the vicinity of −150 deg. C., 4 wt % through 10 wt % is a preferable range.

From the above-described experiments, it was confirmed that, with regard to the composition of base refrigerant plus R-14, when the ratio of R-14 in base refrigerant plus R-14 was in the range of 5 wt % through 40 wt %, then the resultant non-azeotropic refrigerant could work practically to attain the aimed cooling temperature of −100 deg. C. or lower.

Next, as a refrigerant that attains still lower temperatures, one in which the above-mentioned refrigerant mixture consisting of base refrigerant pus R-14, to which, as the base, low boiling point methane (R-50) and argon (R740) were added was effective; and as a non-azeotropic refrigerant mixture that attains a cooling temperature of −120 deg. C. or lower, one in which methane and argon were respectively added in an amount of 1 wt % through 10 wt % (that is, 2 wt % through 20 wt % in total, supposing the dosages of the methane and argon were the same) as opposed to the total refrigerant amount, worked to attain the purpose, and furthermore one in which the contents of these R-50 and R740 were set to 4 wt % through 10 wt %, could attain a low cooling temperature in the vicinity of −150 deg. C.

From above, the non-azeotropic refrigerant mixture of the present invention for attaining a low temperature of −100 deg. C. or lower is a non-azeotropic refrigerant mixture comprising a base refrigerant and R-14 wherein a base refrigerant/R-14 ratio is 95/5 through 60/40 (in other words, R-14 accounts for 5 through 40 wt %);

Also proposed is the non-azeotropic refrigerant mixture for attaining a still lower temperature, which is a non-azeotropic refrigerant mixture comprising a base refrigerant and R-14 and R-50 plus R-740, wherein the base refrigerant/R-14 ratio is 95/5 through 60/40, and each of R-50 and R-740 accounts for 10 wt % (that is, 20 wt % in total);

there is also proposed the non-azeotropic refrigerant mixture for attaining a cooling temperature of −120 deg. C. or lower, which is the case of the immediately above compound where the contents of R-50 and R-740 are respectively 1 wt % through 10 wt %; furthermore, there is proposed the non-azeotropic refrigerant mixture for attaining a cooling temperature in the vicinity of −150 deg. C., which is a non-azeotropic refrigerant mixture wherein the contents of R-50 and R-740 are respectively 4 wt % through 10 wt % (that is, 8 wt % through 20 wt % in total).

INDUSTRIAL APPLICABILITY

The present invention can satisfy conditions that are called for in preserving biological tissues, animal tissues and the like in the medical and biotechnological fields, which are developing conspicuously in recent years, and thereby the present invention can contribute to the progress in these industrial fields.

EXPLANATION OF REFERENCE NUMERALS

1: compressing machine (compressor)
2: condensing apparatus (condenser)
3: throttle valve (capillary tube)
4: evaporating apparatus (evaporator)
5: freezing chamber
6: heat exchanger
7: contact part of heat exchanger
8: outgoing passage (compressor to evaporator)

9. returning passage (evaporation to compressor)
10: insulator layer
(1): temperature measurement site at the exit of throttle valve (capillary)
(2): temperature measurement site in the middle of the freezing chamber
(3): temperature measurement site at the exit of compressor on its high pressure side (discharge side)
(4): temperature measurement site at the entrance of compressor on its low temperature side (intake side)
(5): temperature measurement site at the entrance of heat exchanger (in outgoing passage)
(6): temperature measurement site at the exit of the heat exchanger (in returning passage)
A: temperature measurement site on high pressure side
B: temperature measurement site on low pressure side

The invention claimed is:

1. A non-azeotropic mixture comprising (i) a base refrigerant including a high boiling point refrigerant that releases heat and condenses at normal temperature and (ii) R-14, which is a low boiling point refrigerant; wherein
a base refrigerant/R-14 ratio by weight is 95/5 through 60/40 (that is, R-14 accounts for 5 wt % through 40 wt % of sum of base refrigerant plus R-14)
 said base refrigerant consists of butane plus propane, as high boiling point refrigerant which condenses at normal temperature, and R-23 plus R-116, as low boiling point refrigerant, sum of butane plus propane accounts for 35 wt through 70 wt % of said base refrigerant, balance being R-23 plus R-116, and
 R-23 accounts for 70 through 15 wt % of the sum of R-23 plus R-116 so that R-116 accounts for 30 through 85 wt %.

2. A non-azeotropic refrigerant mixture applicable to a refrigerating system, which is equipped with a structure of a refrigerating system capable of causing a heat exchange between a refrigerant returning to a compressor in a returning passage and a refrigerant outgoing to a throttle valve in an outgoing passage, said non-azeotropic refrigerant mixture having a composition same as any one of the non-azeotropic refrigerant mixtures as described in claim 1.

3. A non-azeotropic refrigerant mixture comprising (i) a base refrigerant including a high boiling point refrigerant that releases heat and condenses at normal temperature, (ii) R-14, which is a low boiling point refrigerant, and (iii) R-50 plus R-740, which are low boiling point refrigerant capable of attaining extremely low temperatures; wherein
 a base refrigerant/R14 ratio by weight is 95/5 through 60/40 (that is, R-14 accounts for 5 wt % through 40 wt % of sum of base refrigerant plus R14),
said base refrigerant consists of butane plus propane, as high boiling point refrigerant which condenses at normal temperature, and R-23 plus R-116, as low boiling point refrigerant, R-23 accounts for 70 through 15 wt % of the sum of R-23 plus R-116 so that R-116 accounts for 30 through 85 wt %, and
 R-50 and R-740 account respectively for 10 wt % or lower (that is, 20 wt % in total) of the total of the refrigerants.

4. The non-azeotropic mixture as clamed in claim 3, wherein R-50 and R-740 account respectively for 1 wt % through 10 wt % (that is, 2 wt % through 20 wt % in total) of the total of the refrigerants.

5. The non-azeotropic mixture as clamed in claim 3, wherein R-50 and R-740 account respectively for 4 wt % through 10 wt % (that is, 4 wt % through 20 wt % in total) of the total of the refrigerants.

6. A non-azeotropic refrigerant mixture applicable to a refrigerating system, which is equipped with a structure of a refrigerating system capable of causing a heat exchange between a refrigerant returning to a compressor in a returning passage and a refrigerant outgoing to a throttle valve in an outgoing passage, said non-azeotropic refrigerant mixture having a composition same as any one of the non-azeotropic refrigerant mixtures as described in claim 3.

\* \* \* \* \*